US012619696B2

(12) United States Patent
Nyamwange et al.

(10) Patent No.: US 12,619,696 B2
(45) Date of Patent: May 5, 2026

(54) SYSTEM AND METHOD FOR GENERATING ON-DEMAND SINGLE-USE BIOMETRIC AUTHENTICATION CREDENTIALS

(71) Applicant: BANK OF AMERICA CORPORATION, Charlotte, NC (US)

(72) Inventors: Elvis Nyamwange, Little Elm, TX (US); Sailesh Vezzu, Hillsborough, NJ (US); Amer Ali, Jersey City, NJ (US); Rahul Shashidhar Phadnis, Charlotte, NC (US); Rahul Yaksh, Austin, TX (US); Hari Vuppala, Concord, NC (US); Pratap Dande, Saint Johns, FL (US); Brian Neal Jacobson, Los Angeles, CA (US); Erik Dahl, Newark, DE (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 246 days.

(21) Appl. No.: 18/382,879

(22) Filed: Oct. 23, 2023

(65) Prior Publication Data

US 2025/0131073 A1      Apr. 24, 2025

(51) Int. Cl.
*G06F 21/32* (2013.01)
*G06N 20/00* (2019.01)

(52) U.S. Cl.
CPC ............. *G06F 21/32* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 4,993,068 | A | 2/1991 | Piosenka |
| 5,719,950 | A | 2/1998 | Osten |
| 5,764,789 | A | 6/1998 | Pare, Jr |
| 5,892,838 | A | 4/1999 | Brady |
| 5,930,804 | A | 7/1999 | Yu |
| 6,018,739 | A | 1/2000 | McCoy |
| 6,038,666 | A | 3/2000 | Hsu |
| 6,167,517 | A | 12/2000 | Gilchrist |
| 6,212,290 | B1 | 4/2001 | Gagne |
| 6,311,272 | B1 | 10/2001 | Gressel |
| 6,317,834 | B1 | 11/2001 | Gennaro |
| 6,496,595 | B1 | 12/2002 | Puchek |
| 6,498,861 | B1 | 12/2002 | Hamid |
| 6,735,695 | B1 | 5/2004 | Gopalakrishnan |

(Continued)

*Primary Examiner* — Scott B Christensen
(74) *Attorney, Agent, or Firm* — Moore & Van Allen PLLC; Anoohya Yarlagadda

(57) ABSTRACT

Embodiments of the present invention provide a system for generating on-demand single-use biometric authentication credentials. The system is configured for determining initiation of an authentication request to access a resource from a user device of a user, prompting the user to select a type of authentication credential from one or more types of authentication credentials, receiving a selection of the type of the authentication credential, instantaneously generating a single-use unique authentication credential associated with the type of the authentication credential, via one or more machine learning models, and transmitting the single-use unique authentication credential to the user device for use in authentication of the user in gaining accessing to the resource.

20 Claims, 6 Drawing Sheets

500

RECEIVE ONE OR MORE CREDENTIAL DATASETS ASSOCIATED WITH ONE OR MORE TYPES OF AUTHENTICATION CREDENTIALS FROM A USER, VIA A USER DEVICE
503

PROCESS THE ONE OR MORE CREDENTIAL DATASETS TO EXTRACT ONE OR MORE FEATURES ASSOCIATED WITH EACH OF THE ONE OR MORE TYPES OF AUTHENTICATION CREDENTIALS
505

TRAIN ONE OR MORE MACHINE LEARNING MODELS BASED ON THE ONE OR MORE FEATURES EXTRACTED FROM THE ONE OR MORE CREDENTIAL DATASETS
510

GENERATE PERMUTED CREDENTIAL DATA ASSOCIATED WITH EACH OF THE ONE OR MORE TYPES OF AUTHENTICATION CREDENTIALS , VIA THE TRAINED ONE OR MORE MACHINE LEARNING MODELS
515

DETERMINE INITIATION OF AN AUTHENTICATION REQUEST TO ACCESS A RESOURCE FROM THE USER DEVICE OF THE USER
520

PROMPT THE USER TO SELECT A TYPE OF AUTHENTICATION CREDENTIAL FROM THE ONE OR MORE TYPES OF AUTHENTICATION CREDENTIALS
525

RECEIVE A SELECTION OF THE TYPE OF THE AUTHENTICATION CREDENTIAL
530

INSTANTANEOUSLY GENERATE A SINGLE-USE UNIQUE AUTHENTICATION CREDENTIAL ASSOCIATED WITH THE TYPE OF THE AUTHENTICATION CREDENTIAL BASED ON THE PERMUTED CREDENTIAL DATA, VIA THE ONE OR MORE MACHINE LEARNING MODELS
535

TRANSMIT THE SINGLE-USE UNIQUE AUTHENTICATION CREDENTIAL TO THE USER DEVICE FOR USE IN AUTHENTICATION OF THE USER IN GAINING ACCESSING TO THE RESOURCE
540

(56)                    References Cited

U.S. PATENT DOCUMENTS

| | | | |
|---|---|---|---|
| 8,220,063 | B2 | 7/2012 | Ting |
| 8,443,200 | B2 | 5/2013 | Karthik |
| 2020/0329334 | A1* | 10/2020 | Kurian ................... H04W 4/80 |
| 2021/0110015 | A1* | 4/2021 | McCarty ................ G06F 21/32 |
| 2021/0264003 | A1* | 8/2021 | Solano .................... G06N 5/01 |
| 2022/0224683 | A1* | 7/2022 | Solano Gomez ... H04L 63/0861 |
| 2024/0070306 | A1* | 2/2024 | Jurat .................. G06F 21/6218 |
| 2024/0121098 | A1* | 4/2024 | Herder, III ........... H04L 9/3255 |
| 2024/0137365 | A1* | 4/2024 | Neighbour ........... H04L 63/102 |
| 2024/0154950 | A1* | 5/2024 | Gean .................. H04L 63/0853 |
| 2024/0195807 | A1* | 6/2024 | Sugavanam ......... H04L 63/083 |
| 2025/0013729 | A1* | 1/2025 | Karweta ................ G06F 21/32 |
| 2025/0045536 | A1* | 2/2025 | Bennett .................. G10L 15/16 |

* cited by examiner

ENTITY
SYSTEM(S)
200

NETWORK
150

AUTHENTICATION CREDENTIAL
GENERATION SYSTEM
300

COMPUTING
DEVICE
SYSTEM
400

USER
110

ENTITY SYSTEM
200

NETWORK COMMUNICATION INTERFACE
210

PROCESSING DEVICE
220

MEMORY DEVICE
230

NETWORK SERVER APPLICATION
240

AUTHENTICATION CREDENTIAL
GENERATION APPLICATION
250

ONE OR MORE ENTITY APPLICATIONS
260

DATA REPOSITORY
280

500

RECEIVE ONE OR MORE CREDENTIAL DATASETS ASSOCIATED WITH ONE OR MORE TYPES OF AUTHENTICATION CREDENTIALS FROM A USER, VIA A USER DEVICE
503

PROCESS THE ONE OR MORE CREDENTIAL DATASETS TO EXTRACT ONE OR MORE FEATURES ASSOCIATED WITH EACH OF THE ONE OR MORE TYPES OF AUTHENTICATION CREDENTIALS
505

TRAIN ONE OR MORE MACHINE LEARNING MODELS BASED ON THE ONE OR MORE FEATURES EXTRACTED FROM THE ONE OR MORE CREDENTIAL DATASETS
510

GENERATE PERMUTED CREDENTIAL DATA ASSOCIATED WITH EACH OF THE ONE OR MORE TYPES OF AUTHENTICATION CREDENTIALS , VIA THE TRAINED ONE OR MORE MACHINE LEARNING MODELS
515

DETERMINE INITIATION OF AN AUTHENTICATION REQUEST TO ACCESS A RESOURCE FROM THE USER DEVICE OF THE USER
520

PROMPT THE USER TO SELECT A TYPE OF AUTHENTICATION CREDENTIAL FROM THE ONE OR MORE TYPES OF AUTHENTICATION CREDENTIALS
525

RECEIVE A SELECTION OF THE TYPE OF THE AUTHENTICATION CREDENTIAL
530

INSTANTANEOUSLY GENERATE A SINGLE-USE UNIQUE AUTHENTICATION CREDENTIAL ASSOCIATED WITH THE TYPE OF THE AUTHENTICATION CREDENTIAL BASED ON THE PERMUTED CREDENTIAL DATA, VIA THE ONE OR MORE MACHINE LEARNING MODELS
535

TRANSMIT THE SINGLE-USE UNIQUE AUTHENTICATION CREDENTIAL TO THE USER DEVICE FOR USE IN AUTHENTICATION OF THE USER IN GAINING ACCESSING TO THE RESOURCE
540

FIG. 5

SYSTEM AND METHOD FOR GENERATING ON-DEMAND SINGLE-USE BIOMETRIC AUTHENTICATION CREDENTIALS

BACKGROUND

There exists a need for a system for generating on-demand single-use biometric authentication credentials.

BRIEF SUMMARY

Embodiments of the present invention address the above needs and/or achieve other advantages by providing apparatuses (e.g., a system, computer program product and/or other devices) and methods for generating on-demand single-use biometric authentication credentials. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention determines initiation of an authentication request to access a resource from a user device of a user, prompts the user to select a type of authentication credential from one or more types of authentication credentials, receives a selection of the type of the authentication credential, instantaneously generates a single-use unique authentication credential associated with the type of the authentication credential, via one or more machine learning models, and transmits the single-use unique authentication credential to the user device for use in authentication of the user in gaining accessing to the resource.

In some embodiments, the present invention generates the single-use unique authentication credential based on one or more credential datasets received from the user.

In some embodiments, the present invention receives the one or more credential datasets associated with the one or more types of authentication credentials from the user, via the user device, processes the one or more credential datasets, and trains the one or more machine learning models based on processing the one or more credential datasets.

In some embodiments, the present invention processes the one or more credential datasets associated with each of the one or more types of authentication credentials based on analyzing the one or more credential datasets to retrieve one or more features associated with the one or more credential datasets, wherein the one or more machine learning models are trained based on the one or more features.

In some embodiments, the present invention generates permuted credential data associated with each of the one or more types of authentication credentials, via the trained one or more machine learning models, wherein the single-use unique authentication credential is generated based on the permuted credential data.

In some embodiments, the present invention generates a unique identifier, associates the unique identifier with the single-use authentication credential, and embeds the unique identifier into the single-use authentication credential.

In some embodiments, the present invention identifies a geolocation associated with initiation of the authentication request and associates the geolocation to the single-use authentication credential.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
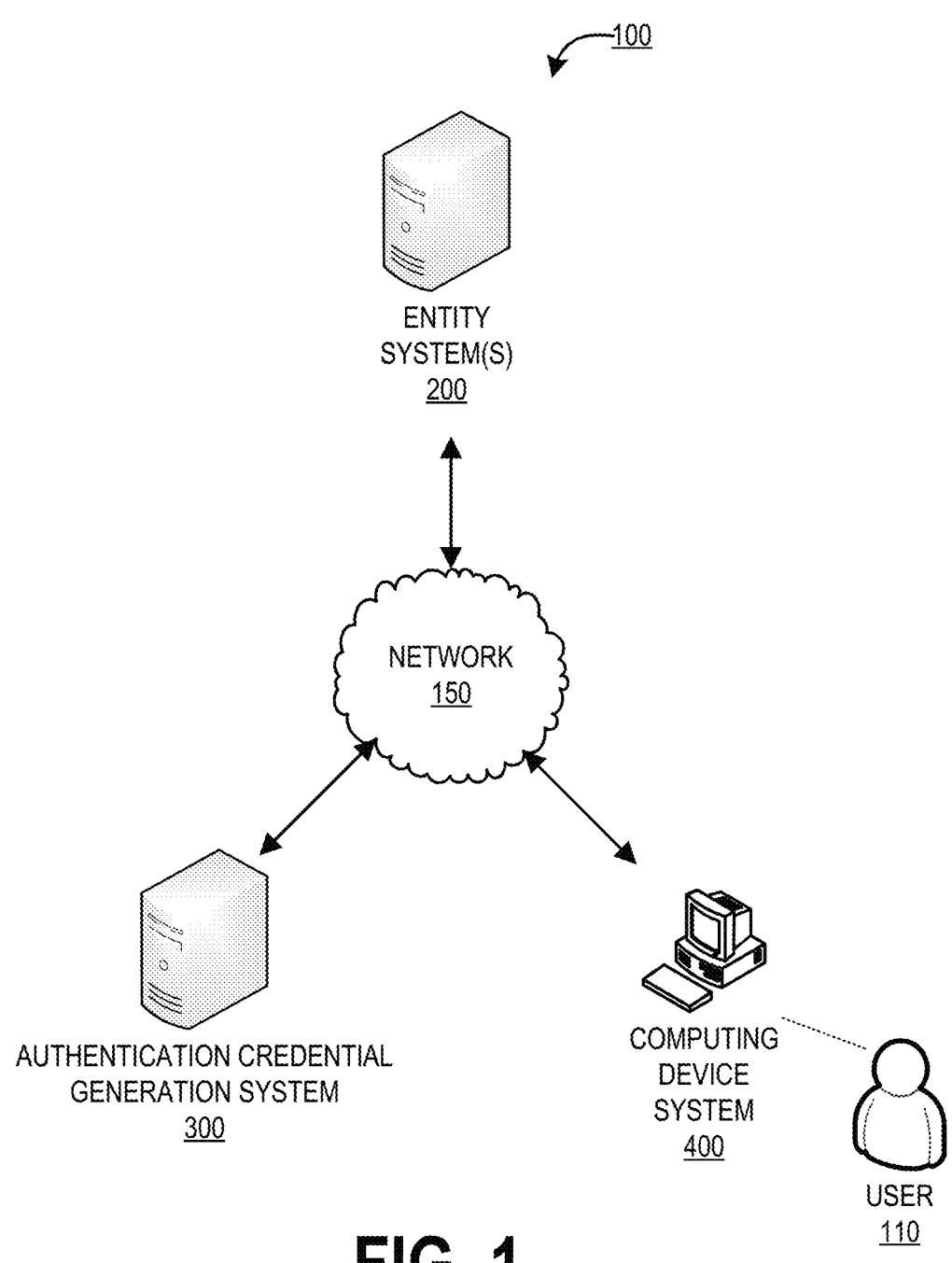
Figure 2:
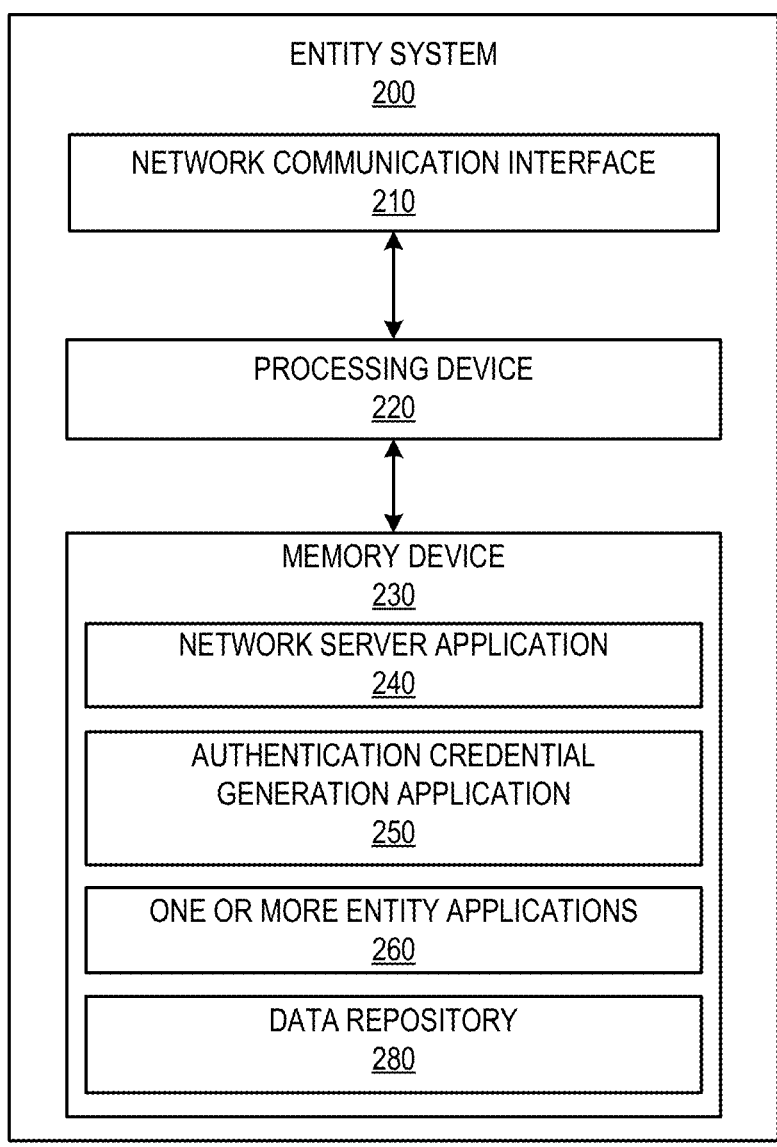
Figure 3:
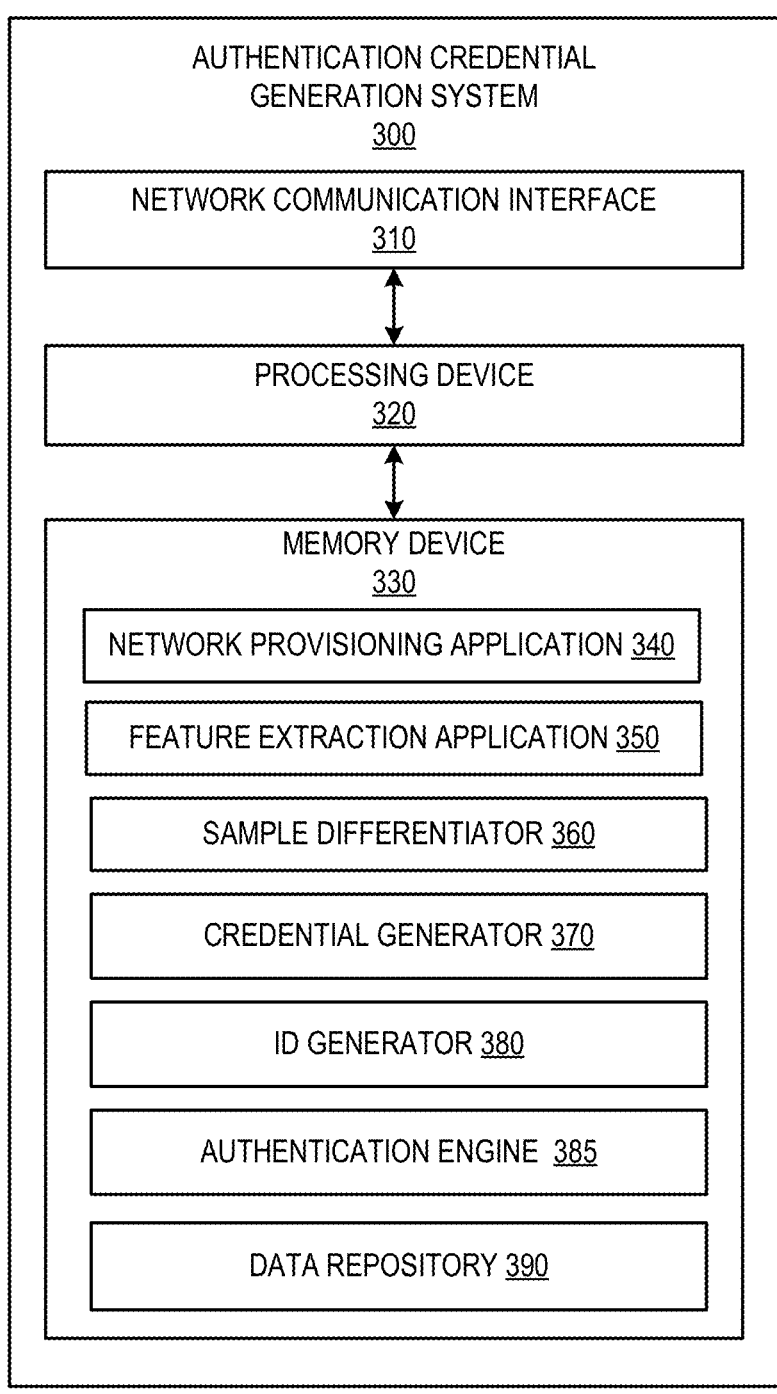
Figure 4:
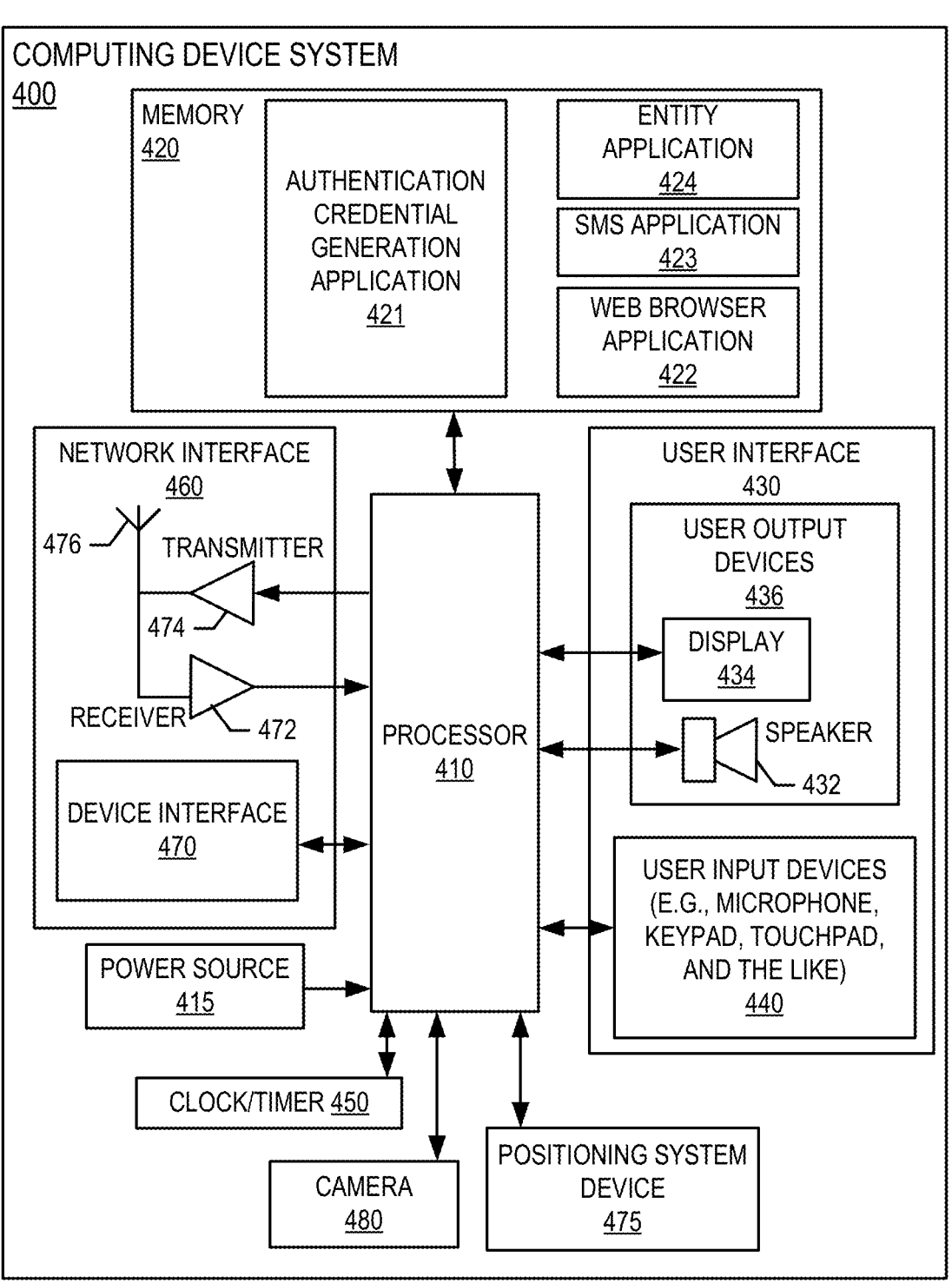
Figure 6:
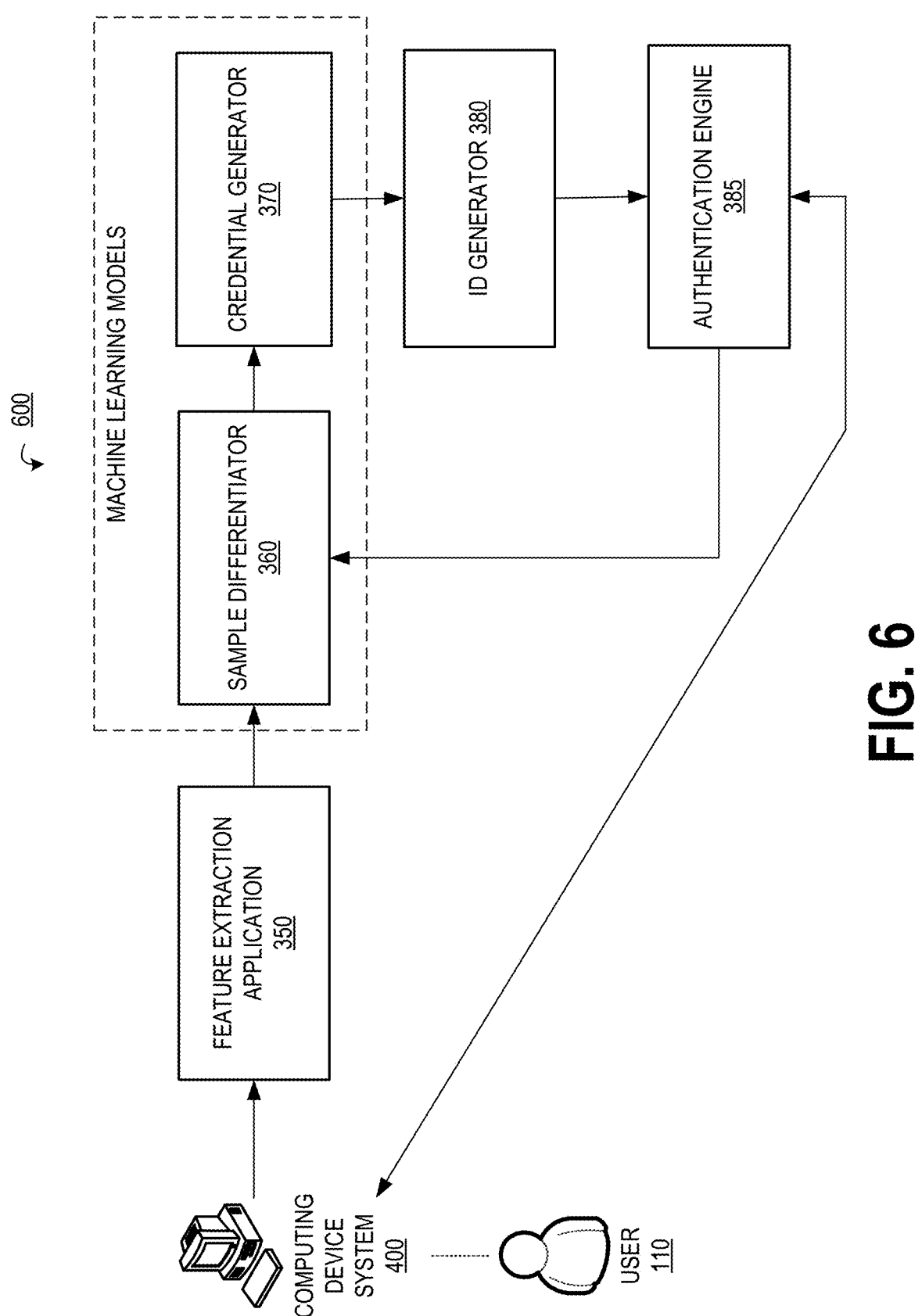

Having thus described embodiments of the invention in general terms, reference will now be made the accompanying drawings, wherein:

FIG. 1 provides a block diagram illustrating a system environment for generating on-demand single-use biometric authentication credentials, in accordance with an embodiment of the invention;

FIG. 2 provides a block diagram illustrating the entity system 200 of FIG. 1, in accordance with an embodiment of the invention;

FIG. 3 provides a block diagram illustrating an authentication credential generation system 300 of FIG. 1, in accordance with an embodiment of the invention;

FIG. 4 provides a block diagram illustrating the computing device system 400 of FIG. 1, in accordance with an embodiment of the invention;

FIG. 5 provides a process flow for generating on-demand single-use biometric authentication credentials, in accordance with an embodiment of the invention; and FIG. 6 provides a block diagram illustrating the process of generating on-demand single-use biometric authentication credentials, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As described herein, the term "entity" may be any organization that has one or more users (e.g., customers) and performs one or more actions for customers based on verifying authenticity of the customers. In some embodiments, the entity may be a financial institution which may include herein may include any financial institutions such as commercial banks, thrifts, federal and state savings banks, savings and loan associations, credit unions, investment companies, insurance companies and the like. In some embodiments, the entity may be a non-financial institution.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more applications, systems, servers, and/or devices provided by the entity and/or the system of the present invention. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Typically, the process of authenticating users is a crucial step while allowing the users to access resources (e.g., cash in financial accounts, computing systems, databases, or the like) or perform actions associated with resources. However, unauthorized users always attempt to gain access to the resources of the authorized users by any of the misappropriation means such as mimicking credentials of the authorized users, cloning, and/or the like. Once credentials of the users (such as biometrics) are compromised when an unauthorized user gains access to the credentials by any of the misappropriation means, identity of the authorized users may be compromised as well. As such, there exists a need for a system to securely authenticate users while safeguarding real-time authentication credentials of users.

FIG. 1 provides a block diagram illustrating a system environment 100 for generating on-demand single-use biometric authentication credentials, in accordance with an embodiment of the invention. As illustrated in FIG. 1, the environment 100 includes an authentication credential generation system 300, entity system 200, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be employees of an entity associated with the entity system 200. In some embodiments, the one or more user(s) 110 of the system environment 100 may be customers of the entity associated with the entity system 200. In some embodiments, the one or more user(s) 110 of the system environment 100 may be potential customers of the entity associated with the entity system 200.

The entity system(s) 200 may be any system owned or otherwise controlled by an entity to support or perform one or more process steps described herein. In some embodiments, the entity is a financial institution. In some embodiments, the entity is a non-financial institution.

The authentication credential generation system 300 is a system of the present invention for performing one or more process steps described herein. In some embodiments, the authentication credential generation system 300 may be an independent system. In some embodiments, the authentication credential generation system 300 may be a part of the entity system 200.

The authentication credential generation system 300, the entity system 200, and/or the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the authentication credential generation system 300 is configured to communicate information or instructions with the entity system 200, and/or the computing device system 400 across the network 150.

The computing device system 400 may be a computing device of the user 110. In general, the computing device system 400 communicates with the user 110 via a user interface of the computing device system 400, and in turn is configured to communicate information or instructions with the authentication credential generation system 300 and/or entity system 200 across the network 150.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In some embodiments, the entity system 200 may be operated by any entity that utilizes machine learning models to perform one or more organizational activities. In certain embodiments, the entity system 200 is operated by a first entity, such as a financial institution, while in other embodiments, the entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a network server application 240, an authentication credential generation application 250, one or more entity applications 260, and a data repository 280. The computer-executable program code of the network server application 240, the authentication credential generation application 250, and the one or more entity applications 260 to perform certain logic, data-extraction, and data-storing functions of the entity system 200 described herein, as well as communication functions of the entity system 200.

The network server application 240, the authentication credential generation application 250, and the one or more entity applications 260 are configured to store data in the data repository 280 or to use the data stored in the data repository 280 when communicating through the network communication interface 210 with the authentication credential generation system 300, and the computing device system 400 to perform one or more process steps described herein. In some embodiments, the entity system 200 may receive instructions from the authentication credential generation system 300 via the authentication credential generation application 250 to perform certain operations. The authentication credential generation application 250 may be provided by the authentication credential generation system 300.

FIG. 3 provides a block diagram illustrating the authentication credential generation system 300 in greater detail, in accordance with embodiments of the invention. As illustrated in FIG. 3, in one embodiment of the invention, the authentication credential generation system 300 includes one or more processing devices 320 operatively coupled to a network communication interface 310 and a memory device 330. In certain embodiments, the authentication credential generation system 300 is operated by a first entity, such as a financial institution, while in other embodiments, the authentication credential generation system 300 is operated by an entity other than a financial institution. In some embodiments, the authentication credential generation system 300 is owned or operated by the entity of the entity system 200. In some embodiments, the authentication credential generation system 300 may be an independent system. In alternate embodiments, the authentication credential generation system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the authentication credential generation system 300 described herein. For example, in one embodiment of the authentication credential generation system 300, the memory device 330 includes, but is not limited to, a network provisioning application 340, a feature extraction application 350, a sample differentiator 360, a credential generator 370, an ID generator 380, an authentication engine 385, and a data repository 390 comprising data processed or accessed by one or more applications in the memory device 330. The computer-executable program code of the network provisioning application 340, the feature extraction application 350, the sample differentiator 360, the credential generator 370, the ID generator 380, and the authentication engine 385 may instruct the processing device 320 to perform certain logic, data-processing, and data-storing functions of the authentication credential generation system 300 described herein, as well as communication functions of the authentication credential generation system 300.

The network provisioning application 340, the feature extraction application 350, the sample differentiator 360, the credential generator 370, the ID generator 380, and the authentication engine 385 are configured to invoke or use the data in the data repository 390 when communicating through the network communication interface 310 with the entity system 200, and the computing device system 400. In some embodiments, the network provisioning application 340, the feature extraction application 350, the sample differentiator 360, the credential generator 370, the ID generator 380, and the authentication engine 385 may store the data extracted or received from the entity system 200 and the computing device system 400 in the data repository 390. In some embodiments, the network provisioning application 340, the feature extraction application 350, the sample differentiator 360, the credential generator 370, the ID generator 380, and the authentication engine 385 may be a part of a single application. One or more processes performed by the feature extraction application 350, the sample differentiator 360, the credential generator 370, the ID generator 380, and the authentication engine 385 are described in FIGS. 5 and 6.

FIG. 4 provides a block diagram illustrating a computing device system 400 of FIG. 1 in more detail, in accordance with embodiments of the invention. However, it should be understood that the computing device system 400 is merely illustrative of one type of computing device system that may benefit from, employ, or otherwise be involved with embodiments of the present invention and, therefore, should not be taken to limit the scope of embodiments of the present invention. The computing devices may include any one of portable digital assistants (PDAs), pagers, mobile televisions, mobile phone, entertainment devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 150. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like. For example, the computing device system 400 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 4GPP protocols and/or the like. The computing device system 400 may also be configured to operate in accordance with non-cellular communication mechanisms, such as via a wireless local area network (WLAN) or other communication/data networks.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110 may include any of a number of devices allowing the computing device system 400 to receive data from the user 110, such as a keypad, keyboard, touch-screen, touch-pad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, an authentication credential generation application 421, an entity application 424, or the like. These applications also typically instructions to a graphical user interface (GUI) on the display 430 that allows the user 110 to interact with the entity system 200, the authentication credential generation system 300, and/or other devices or systems. The memory 420 of the computing device system 400 may comprise a Short Message Service (SMS) application 423 configured to send, receive, and store data, information, communications, alerts, and the like via the wireless network 150.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 provides a process flow for generating on-demand single-use biometric authentication credentials, in accordance with an embodiment of the invention. The process flow 500 may be initiated when a user initiates an enrollment request to enroll with the system of the present invention by submitting one or more real user credentials, which may include, but are not limited to, fingerprint, Iris, face, hand, voice, DNA, or the like. As shown in block 503, the system receives one or more credential datasets associated with one or more types of authentication credentials from a user, via a user device. In some embodiments, the one or more credential datasets may be biometric credential datasets. In some embodiments, the one or more credential datasets may be associated with different types of biometric credentials which include, but are not limited to, fingerprint, Iris, face, voice, hand, DNA, or the like. While enrolling the user, the system may prompt the user to submit multiple samples associated with each of the one or more types of authentication credentials. The system may formulate the one or more credential datasets from the samples provided by the user. In some embodiments, the system does not store the one or more credential datasets associated with samples provided by the user for security purposes. Instead, the system process the one or more credential datasets and discards them after processing. In some embodiments, the system may store the one or more credential datasets in a temporary storage device, such as a Random Access Memory (RAM), or the like. In some embodiments, the system instantly processes the one or more credential datasets without storing them to temporary storage devices.

As shown in block 505, the system processes the one or more credential datasets to extract one or more features associated with each of the one or more types of authentication credentials. The one or more features may comprise significant traits associated with each of the one or more credentials in the one or more credential datasets. For example, if a credential dataset is associated with a real finger print of the user, the system may identify unique features such as fingerprint ridge patterns (e.g., arches, loops, whorls, or the like) and fingerprint ridge characteristics (e.g., core, ending ridge, short ridge, fork, delta, hook, eye, dot, crossover, bridge, enclosures, specialty, or the like). In some embodiments, the system may process the one or more credential datasets to extract only high level features associated with the one or more credential datasets associated with each of the one or more types of authentication credentials received from the user.

As shown in block 510, the system trains one or more machine learning models based on the one or more features extracted from the one or more credential datasets. In some embodiments, the system may receive independent training for each user enrolled in the system of the present invention using the one or more credential datasets received from the user. In some embodiments, the one or more machine learning models comprise Generative Adversarial Networks. In some embodiments, the system may use the one or more machine learning models to process the one or more credential datasets to extract one or more features associated with each of the one or more types of authentication credentials.

As shown in block 515, the system generates permuted credential data associated with each of the one or more types of authentication credentials, via the trained one or more machine learning models. The machine learning models, based on the training received from the one or more features extracted from the one or more credential datasets, generate permuted credential data, where the permuted credential data comprises transformed credentials that are based on the one or more credential datasets. In some embodiments, the permuted credential data statistically represents the one or more credential datasets received from the user. In some embodiments, the permuted credential data may comprise at least one significant features associated with the real credentials received from the user. In some embodiments, the permuted credential data does not comprise any features associated with the real credentials received from the user. In some embodiments, the permuted credential data is generated with some relevance to the one or more features extracted from the one or more credential datasets. In some embodiments, the permuted credential data comprises transformed features that are generated based on the one or more features extracted from the one or more credential datasets. In some embodiments, the permuted credential data may comprise different variations of each of the transformed features.

As shown in block 520, the system determines initiation of an authentication request to access a resource from the user device of the user. The authentication request may be related to accessing any type of resources including, but not limited to, systems, servers, applications, databases, locations, buildings, or the like associated with an entity. In some embodiments, the system may continuously monitor to identify any authentication requests raised by all users that are enrolled in the system of the present invention.

As shown in block 525, the system prompts the user to select a type of authentication credential from the one or more types of authentication credentials. In response to determining initiation of the authentication request, the system may identify that the user is enrolled in the system with 'n' different types of authentication credentials, display the 'n' different types of authentication credentials to the user, and prompt the user to select at least one type of authentication credential from the 'n' different types of credentials. For example, the system may identify that the user is enrolled in the system with fingerprints and voice, the system may prompt the user to select one from the options of fingerprint and voice. As shown in block 530, the system receives a selection of the type of the authentication credential.

As shown in block 535, the system instantaneously generates a single-use unique authentication credential associated with the type of the authentication credential based on the permuted credential data, via the one or more machine learning models. The single-use unique authentication credential may be generated instantaneously after the initiation of the authentication request based on the permuted credential data. In some embodiments, the system may generate a unique identifier and may link the unique identifier with the single-use unique authentication credential. In some embodiments, the system may embed the unique identifier in the single-use unique authentication credential. In some embodiments, the system may store the single-use unique authentication credential and the unique identifier in a data repository (e.g., data repository 390). In some embodiments, the system may refer the data repository to verify that newly generated single-use authentication credentials at a later time period have no resemblance to the previously generated single-use authentication credentials stored in the data repository. For example, the system may identify initiation of a new authentication request and may generate a new single-use authentication credential that is different from the single-use authentication credential. In some embodiments, the system may also track the usage of the single-use authentication credential and may store usage related data by linking with the unique identifier. In such embodiments, the system may continuously update the data repository based on tracking the usage of the single-use authentication credential. In some embodiments, the system may identify a geolocation associated with initiation of the authentication request and associate the geolocation to the single-use authentication credential.

As shown in block 540, the system transmits the single-use unique authentication credential to the user device for use in authentication of the user in gaining accessing to the resource. In some embodiments, the system may validate a location of the user with the geolocation tagged to the single-use authentication credential during the authentication process.

FIG. 6 provides a block diagram illustrating the process of generating on-demand single-use biometric authentication credentials, in accordance with an embodiment of the invention. As shown, the user 110 may initiate an enrollment process to enroll in the system by providing real credentials to the feature extraction application 350, where the feature extraction application 350 processes the real credentials to extract one or more features and discards the real credentials received from the user. The sample differentiator 360 may process the real credentials by differentiating samples of the real credentials received from the user. The machine learning models are trained using the one or more features in the training phase. The authentication engine 385 may monitor the computing device system 400 to identify any real-time authentication requests that are initiated by the user. Upon identifying initiation of an authentication request, the system may transmit a trigger to the sample differentiator 360 in the machine learning model generates permuted credential data which is distinguished transformed data based on the training received from the one or more features. Based on the permuted credential data generated by the sample differentiator 360, the credential generator 370 generated a single-use unique authentication credential which is then linked to a unique identifier generated by the ID generator 380. The authentication engine 385 then transmits the single-use unique authentication credential is to the computing device system and/or a third party system (e.g., Point of Sale device, application, website, or the like) for performing authentication of the user or processing the authentication request initiated by the user.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for generating on-demand single-use biometric authentication credentials, comprising:
   at least one processing device;
   at least one memory device; and
   a module stored in the at least one memory device comprising executable instructions that when executed by the at least one processing device, cause the at least one processing device to:
      determine initiation of an authentication request to access a resource from a user device of a user;
      prompt the user to select a type of biometric authentication credential from one or more types of biometric authentication credentials;
      receive a selection of the type of the biometric authentication credential;
      instantaneously generate a single-use unique biometric authentication credential associated with the type of the biometric authentication credential, via one or more machine learning models; and
      transmit the single-use unique biometric authentication credential to the user device for use in authentication of the user in gaining accessing to the resource.

2. The system according to claim 1, wherein the executable instructions cause the at least one processing device to generate the single-use unique biometric authentication credential based on one or more credential datasets received from the user.

3. The system according to claim 2, wherein the executable instructions cause the at least one processing device to:
   receive the one or more credential datasets associated with the one or more types of biometric authentication credentials from the user, via the user device;
   process the one or more credential datasets; and
   train the one or more machine learning models based on processing the one or more credential datasets.

4. The system according to claim 3, wherein the executable instructions cause the at least one processing device to process the one or more credential datasets associated with each of the one or more types of biometric authentication credentials based on analyzing the one or more credential datasets to retrieve one or more features associated with the one or more credential datasets, wherein the one or more machine learning models are trained based on the one or more features.

5. The system according to claim 4, wherein the executable instructions cause the at least one processing device to generate permuted credential data associated with each of the one or more types of biometric authentication credentials, via the trained one or more machine learning models, wherein the single-use unique biometric authentication credential is generated based on the permuted credential data.

6. The system according to claim 1, wherein the executable instructions cause the at least one processing device to:
   generate a unique identifier;
   associate the unique identifier with the single-use biometric authentication credential; and
   embed the unique identifier into the single-use biometric authentication credential.

7. The system according to claim 1, wherein the executable instructions cause the at least one processing device to:
   identify a geolocation associated with initiation of the authentication request; and
   associate the geolocation to the single-use biometric authentication credential.

8. A computer program product for generating on-demand single-use biometric authentication credentials, comprising a non-transitory computer-readable storage medium having computer-executable instructions for:
   determining initiation of an authentication request to access a resource from a user device of a user;
   prompting the user to select a type of biometric authentication credential from one or more types of biometric authentication credentials;
   receiving a selection of the type of the biometric authentication credential;
   instantaneously generating a single-use unique biometric authentication credential associated with the type of the biometric authentication credential, via one or more machine learning models; and
   transmitting the single-use unique biometric authentication credential to the user device for use in authentication of the user in gaining accessing to the resource.

9. The computer program product according to claim 8, wherein the non-transitory computer-readable storage medium comprises computer-executable instructions for generating the single-use unique biometric authentication credential based on one or more credential datasets received from the user.

10. The computer program product according to claim 9, wherein the non-transitory computer-readable storage medium comprises computer-executable instructions for:
   receiving the one or more credential datasets associated with the one or more types of biometric authentication credentials from the user, via the user device;
   processing the one or more credential datasets; and
   training the one or more machine learning models based on processing the one or more credential datasets.

11. The computer program product according to claim 10, wherein the non-transitory computer-readable storage medium comprises computer-executable instructions for processing the one or more credential datasets associated with each of the one or more types of biometric authentication credentials based on analyzing the one or more credential datasets to retrieve one or more features associated with the one or more credential datasets, wherein the one or more machine learning models are trained based on the one or more features.

12. The computer program product according to claim 11, wherein the non-transitory computer-readable storage medium comprises computer-executable instructions for generating permuted credential data associated with each of the one or more types of biometric authentication credentials, via the trained one or more machine learning models, wherein the single-use unique biometric authentication credential is generated based on the permuted credential data.

13. The computer program product according to claim 8, wherein the non-transitory computer-readable storage medium comprises computer-executable instructions for:
   generating a unique identifier;
   associating the unique identifier with the single-use biometric authentication credential; and
   embedding the unique identifier into the single-use biometric authentication credential.

14. The computer program product according to claim 8, wherein the non-transitory computer-readable storage medium comprises computer-executable instructions for:

identifying a geolocation associated with initiation of the authentication request; and associating the geolocation to the single-use biometric authentication credential.

15. A computerized method for generating on-demand single-use biometric authentication credentials, the method comprising:

determining initiation of an authentication request to access a resource from a user device of a user;

prompting the user to select a type of biometric authentication credential from one or more types of biometric authentication credentials;

receiving a selection of the type of the biometric authentication credential;

instantaneously generating a single-use unique biometric authentication credential associated with the type of the biometric authentication credential, via one or more machine learning models; and transmitting the single-use unique biometric authentication credential to the user device for use in authentication of the user in gaining accessing to the resource.

16. The computerized method according to claim 15, wherein the method comprises generating the single-use unique biometric authentication credential based on one or more credential datasets received from the user.

17. The computerized method according to claim 16, wherein the method comprises:

receiving the one or more credential datasets associated with the one or more types of biometric authentication credentials from the user, via the user device;

processing the one or more credential datasets; and training the one or more machine learning models based on processing the one or more credential datasets.

18. The computerized method according to claim 17, wherein the method comprises processing the one or more credential datasets associated with each of the one or more types of biometric authentication credentials based on analyzing the one or more credential datasets to retrieve one or more features associated with the one or more credential datasets, wherein the one or more machine learning models are trained based on the one or more features.

19. The computerized method according to claim 18, wherein the method comprises generating permuted credential data associated with each of the one or more types of biometric authentication credentials, via the trained one or more machine learning models, wherein the single-use unique biometric authentication credential is generated based on the permuted credential data.

20. The computerized method according to claim 15, wherein the method comprises:

generating a unique identifier;

associating the unique identifier with the single-use biometric authentication credential; and embedding the unique identifier into the single-use biometric authentication credential.

* * * * *